(12) United States Patent
Petculescu et al.

(10) Patent No.: US 9,723,054 B2
(45) Date of Patent: Aug. 1, 2017

(54) HIERARCHICAL ORGANIZATION FOR SCALE-OUT CLUSTER

(71) Applicant: Microsoft Technology Licensing, LLC, Redmond, WA (US)

(72) Inventors: Cristian Petculescu, Seattle, WA (US); Amir Netz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 14/144,355

(22) Filed: Dec. 30, 2013

(65) Prior Publication Data

US 2015/0188978 A1    Jul. 2, 2015

(51) Int. Cl.
| | | |
|---|---|---|
| G06F 15/16 | (2006.01) | |
| H04L 29/08 | (2006.01) | |
| G06F 9/50 | (2006.01) | |

(52) U.S. Cl.
CPC ............ *H04L 67/02* (2013.01); *G06F 9/5061* (2013.01); *H04L 67/1089* (2013.01)

(58) Field of Classification Search
CPC .... H04L 67/1089; H04L 67/02; G06F 9/5061
See application file for complete search history.

(56) References Cited

U.S. PATENT DOCUMENTS

| | | | |
|---|---|---|---|
| 5,809,516 A | 9/1998 | Ukai et al. | |
| 6,028,539 A | 2/2000 | Matsui | |
| 6,175,906 B1 | 1/2001 | Christie | |
| 6,189,094 B1 | 2/2001 | Hinds et al. | |
| 6,629,314 B1 | 9/2003 | Wu | |
| 6,662,268 B1 | 12/2003 | Mcbrearty et al. | |
| 6,701,420 B1 | 3/2004 | Hamilton et al. | |
| 6,741,983 B1 | 5/2004 | Birdwell et al. | |
| 7,352,390 B2 | 4/2008 | Gonzalez | |
| 7,467,169 B2 | 12/2008 | Gole et al. | |
| 7,617,184 B2* | 11/2009 | Ferrari | G06F 17/30873 |
| 7,818,349 B2 | 10/2010 | Frost | |

(Continued)

FOREIGN PATENT DOCUMENTS

| | | |
|---|---|---|
| CN | 102867046 A | 1/2013 |
| EP | 2555129 A1 | 2/2013 |
| JP | 20130074802 | 3/2013 |

OTHER PUBLICATIONS

Klein, et al., "A Scalable Distributed Architecture for Network- and QoS-aware Service Composition", In Proceedings of Joint Agent-oriented Workshops in Synergy, Sep. 9, 2012, 8 pages.

(Continued)

*Primary Examiner* — Tonia L Dollinger
*Assistant Examiner* — Dixon Dabipi
(74) *Attorney, Agent, or Firm* — Workman Nydegger (57) ABSTRACT

Performing a distributed data operation. A method includes receiving a request for one or more data operations from a first computing system, such as a client. The method further includes determining a number of node endpoints that can be used to satisfy the query. Based on the number of node endpoints, the method further includes selecting a plan from the group consisting essentially of a flat data operation plan, a hierarchical data operation plan or a combination of partially flat/partially hierarchical data operation plan. The request for one or more data operations is serviced using the selected data operation plan.

19 Claims, 7 Drawing Sheets

(56) References Cited

U.S. PATENT DOCUMENTS

| | | | |
|---|---|---|---|
| 7,827,279 B2 * | 11/2010 | Xu | H04L 45/02 709/224 |
| 7,921,142 B2 | 4/2011 | Chang et al. | |
| 8,139,593 B2 | 3/2012 | Dravida et al. | |
| 8,156,107 B2 | 4/2012 | Bawa et al. | |
| 8,312,037 B1 * | 11/2012 | Bacthavachalu | G06F 9/5066 707/769 |
| 8,312,039 B2 * | 11/2012 | Gilula | G06Q 30/0269 707/706 |
| 8,489,817 B2 | 7/2013 | Flynn et al. | |
| 9,049,145 B2 * | 6/2015 | Li | H04L 45/12 |
| 2002/0069317 A1 | 6/2002 | Chow et al. | |
| 2004/0078622 A1 * | 4/2004 | Kaminsky | G06F 11/0748 714/4.1 |
| 2004/0122845 A1 * | 6/2004 | Lohman | G06F 17/30584 |
| 2005/0102613 A1 | 5/2005 | Boukouvalas et al. | |
| 2008/0052469 A1 | 2/2008 | Fontenot et al. | |
| 2009/0254774 A1 | 10/2009 | Chamdani et al. | |
| 2010/0180095 A1 | 7/2010 | Fujibayashi et al. | |
| 2011/0072197 A1 | 3/2011 | Lund et al. | |
| 2011/0072437 A1 * | 3/2011 | Druyan | G06F 9/505 718/104 |
| 2011/0082983 A1 | 4/2011 | Koktan | |
| 2011/0191522 A1 | 8/2011 | Condict et al. | |
| 2011/0320733 A1 | 12/2011 | Sanford et al. | |
| 2012/0072652 A1 | 3/2012 | Celis et al. | |
| 2012/0110538 A1 * | 5/2012 | Shih | G06F 17/5077 716/129 |
| 2012/0131126 A1 | 5/2012 | Bandyopadhyay et al. | |
| 2012/0150527 A1 | 6/2012 | Creedon et al. | |
| 2013/0019057 A1 | 1/2013 | Stephens et al. | |
| 2014/0082293 A1 | 3/2014 | Alexander et al. | |
| 2014/0108421 A1 * | 4/2014 | Isaacson | G06F 17/30575 707/747 |
| 2014/0325145 A1 | 10/2014 | Sampathkumar | |
| 2015/0186255 A1 | 7/2015 | Petculescu et al. | |
| 2015/0186410 A1 | 7/2015 | Petculescu et al. | |
| 2016/0239513 A1 | 8/2016 | Petculescu et al. | |

OTHER PUBLICATIONS

"Basic RAID Organizations", Published on: Sep. 20, 2000, Available at: http://www.ecs.umass.edu/ece/koren/architecture/Raid/basicRAID.html.

"Disk Configuration for Sequential Scans", Published on: Jan. 25, 2000, Available at: http://www.ixora.com.au/tips/creation/sequential_reads.htm.

Rahm, et al., "Analysis of Parallel Scan Processing in Shared Disk Database Systems", In Proceedings of First International Euro-Par Conference of Parallel Processing, Aug. 29, 1995, 14 pages.

Chen, et al., "Essential Roles of Exploiting Internal Parallelism of Flash Memory based Solid State Drives in High-Speed Data Processing", In Proceedings of IEEE 17th International Symposium on High Performance Computer Architecture, Feb. 12, 2011, 12 pages.

Do, et al., "Turbocharging DBMS Buffer Pool Using SSDs", In Proceedings of the International Conference on Management of Data ACM SIGMOD, Jun. 12, 2011, 12 pages.

Holloway, Allison L., "Adapting Database Storage for New Hardware", In Thesis for Degree of Philosophy, Retrieved on: Oct. 11, 2013, 146 pages.

"Buffer Pool Extension", Retrieved on: Oct. 11, 2013, Available at: http://technet.microsoft.com/en-us/library/dn133176(v=sql.120).aspx.

Canim, et al., "SSD Bufferpool Extensions for Database Systems", In Proceedings of the VLDB Endowment, vol. 3, Issue 1-2, Sep. 2010, 12 pages.

"International Search Report & Written Opinion for PCT Application No. PCT/US2014/071777", Mailed Date: Mar. 31, 2015, 9 Pages.

"Second Written Opinion Issued in PCT Application No. PCT/US2014/071777", Mailed Date: Nov. 19, 2015, 6 Pages.

Notice of Allowance dated Dec. 22, 2015 cited in U.S. Appl. No. 14/144,374.

"International Preliminary Report on Patentability Issued in PCT Application No. PCT/US2014/071777", Mailed Date: Feb. 17, 2016, 7 Pages.

Office Action dated Apr. 7, 2016 cited in U.S. Appl. No. 14/144,418.

Office Action dated Aug. 26, 2016 cited in U.S. Appl. No. 14/144,418.

Office Action dated Jan. 20, 2017 cited in U.S. Appl. No. 15/137,827.

Office Action dated Mar. 13, 2017 cited in U.S. Appl. No. 14/144,418.

Notice of Allowance dated Mar. 17, 2017 cited in U.S. Appl. No. 15/137,827.

Office Action dated Sep. 16, 2015 cited in U.S. Appl. No. 14/144,418.

Office Action dated Oct. 9, 2015 cited in U.S. Appl. No. 14/144,374.

Office Action dated Apr. 17, 2017 cited in U.S. Appl. No. 15/137,827 (Copy Attached).

* cited by examiner

HIERARCHICAL ORGANIZATION FOR SCALE-OUT CLUSTER

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Cloud systems are an example of a service oriented architecture where services are distributed across a number of different nodes in a system. However, on-premise systems may also be implemented in a distributed fashion to provide functionality according to a service oriented architecture.

One service that can be provided in a distributed fashion is a database service. When a query is made on a distributed database service, multiple nodes in the service may be involved in satisfying the query. In particular, the data returned or used as a result of the query may be stored on multiple different nodes.

Portions of data will be returned from different nodes and the portions will be assembled to create a complete result. Thus, there are communication and overhead costs for communicating with the different nodes and for assembling results. Some current systems are able to involve as many as 200 different nodes without significant degradation of performance. However, scaling beyond that point can result in significant degradation to the distributed database performance. In particular, such systems are often implemented using a hub and spoke architecture and have a limited fan-out on the number of spokes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment, The method includes acts for performing a distributed data operation. The method includes receiving a request for one or more data operations from a first computing system, such as a client. The method further includes determining a number of node endpoints that can be used to satisfy the query. Based on the number of node endpoints, the method further includes selecting a plan from the group consisting essentially of a flat data operation plan, a hierarchical data operation plan or a combination of partially flat/partially hierarchical data operation plan. The request for one or more data operations is serviced using the selected data operation plan.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments may be directed towards implementation of a distributed database system. In particular, in a distributed database system, shards of data are stored on various nodes within the system. The shards can be retrieved from the nodes, merged, and operations performed on the merged data.

Figure 1:
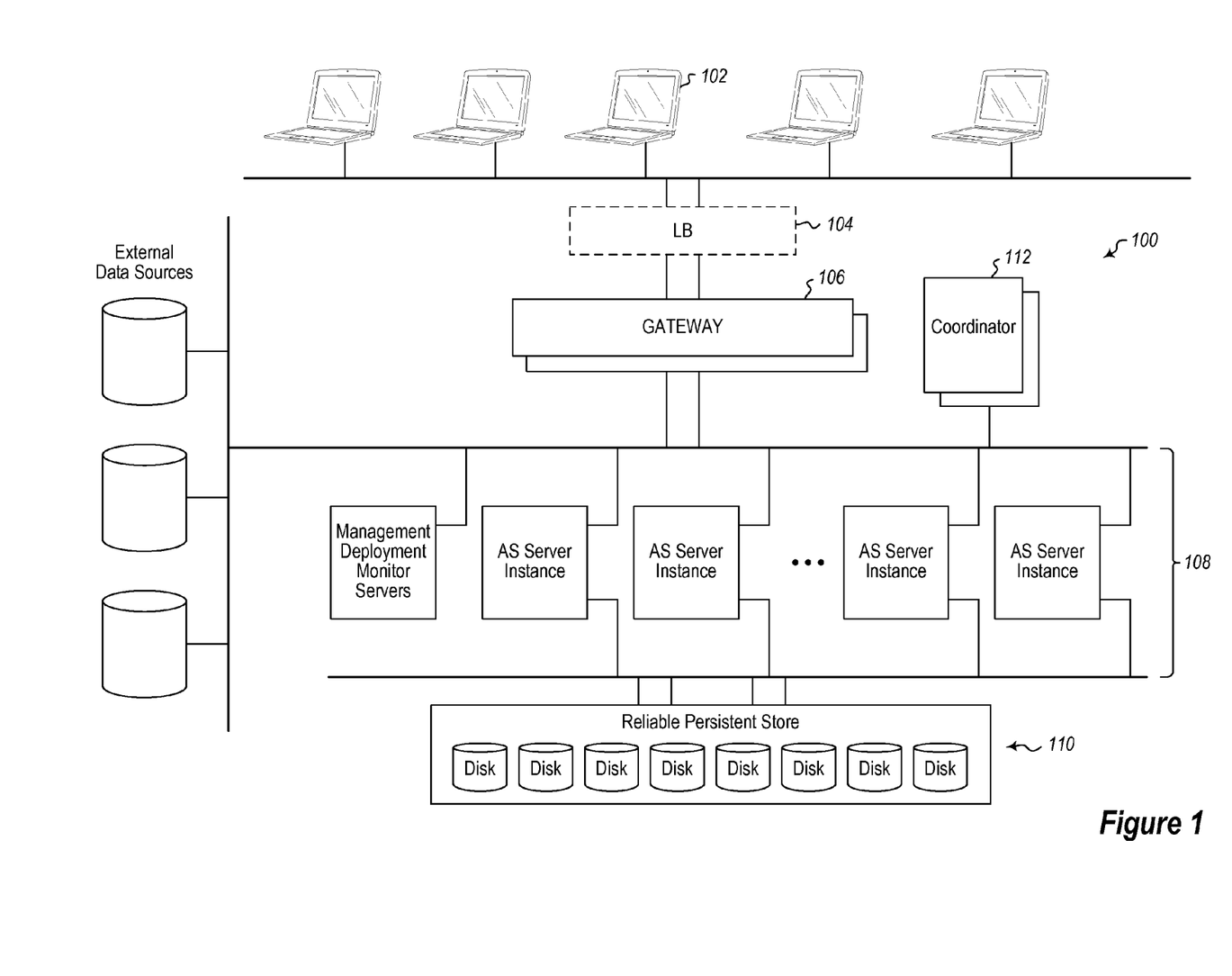
FIG. 1 illustrates interaction with a distributed database system.

An example is illustrated FIG. 1. FIG. 1 illustrates a client 102. The client 102 optionally communicates a query to a load balancer 104. The load balancer 104 sends queries from the various clients to a gateway 106. Note, that in some embodiments, the client 102 can send a query directly to the gateway 106.

The gateway 106 provides a single endpoint, such as in some embodiments, an XML for Analysis (XMLA) endpoint, for users to connect to a cluster. In some embodiments, the gateway may include functionality similar to, and may be based on the AS Windows Azure™ gateway available from Microsoft Corporation of Redmond Wash. However, some embodiments may further include an enhanced security model for the gateway 106. For example, the gateway 106 may include support for Kerberos to enable on-premise scenarios.

On an initial connection from a client 102, the gateway 106 is responsible for identifying a database and selecting an appropriate server node from the backend 108. That server node becomes the master server node for the user's session and all subsequent requests on that session are directed to the same master server node. One or more different policies can be used by the gateway 106 to select a master server node. For example, in some embodiments, a simple round-robin selection may be used. Alternatively or additionally, random selection may be used. Alternatively or additionally, a more sophisticated load-balancing or adaptive algorithm could be used.

Embodiments may be implemented where the gateway 106 is largely stateless. In such embodiments, for scalability or reliability, it is possible to have multiple gateways within a single cluster 100. Each gateway will have a unique endpoint. As such, a client may have to have sufficient intelligence to choose the right one. Alternatively, the gateways could be behind a network load-balancer 104 which could ensure that clients connect with the correct gateway.

Thus, the gateway 106 selects a server node to coordinate servicing the query. The selected node acts as a master node. The master node communicates with various slave nodes in the back end 108. The slave nodes host (such as by storing or pointing to) shards of data that are needed to service the query from the client 102. As noted, different nodes in the backend 108 store (or access from persistent storage, illustrated as store 110), different shards of data that may be needed to service the query from the client 102.

FIG. 1 further illustrates a coordinator 112. The coordinator 112 implements a directory that maps the partitions of a sharded table onto the server nodes in the cluster 100. The coordinator 112 provides, in the illustrated example, a simple XMLA-based protocol that allows the master server node to query which server nodes are (or should be) hosting any given shard of data. Once the master server node gets this information from the coordinator 112, it sends further requests for shards directly to the appropriate server node.

The coordinator 112 is built on top of a cluster fabric. The cluster fabric makes the policy decisions about where to place shards/partitions.

To prevent the coordinator 112 from being a single point of failure, embodiments may have multiple coordinators within a cluster 100.

Every server node in the cluster can function as both a master server node and a slave server node. The master server node is responsible for receiving the query from the client 102 (after it passes through the gateway 106) and performing normal query handling. Once the query reaches the storage layer of the backend 108, the in memory business intelligence engine is responsible for parallelizing that query across the shards. Then the master server node sends a query request to the coordinator 112 to find the location of the shards that are involved in the query. Once the master server node gets a response back from the coordinator 112, it sends the appropriate subqueries directly to those server nodes. These server nodes are referred to as slave server nodes. Note that a particular server node can be both a master server node and slave server node for the same query.

Figure 2:
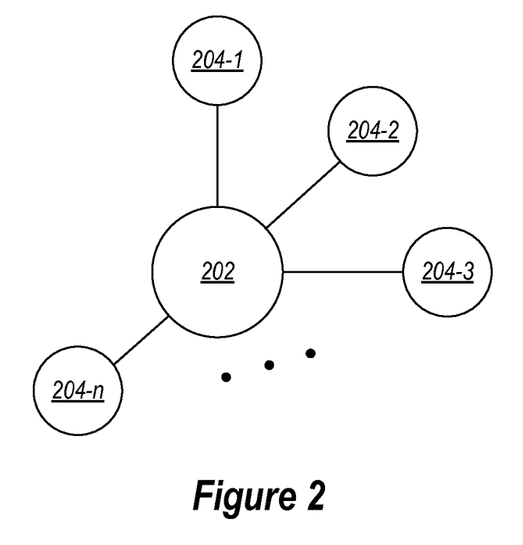
FIG. 2 illustrates a simplified example of a master and a number of slave nodes.

When all the slave server nodes have finished processing their subqueries, the results are returned to the master server node which is responsible for the final aggregation of the slave node results to create the final response to the client. A simplified example is illustrated in FIG. 2. FIG. 2 illustrates a master node 202. The master node 202 communicates with a set of slave nodes 204-1 204-2 204-3 through 204-n.

Within an instance of a service, a loaded database will include the dimension tables for the database that support relationships to a sharded table.

In the illustrated embodiment, the server nodes are responsible for deployment and operation of the physical cluster. In particular, the server nodes may be responsible for the bare metal deployment of the operating system to the nodes that make up the cluster (gateway, coordinator, server instances). In addition to deployment the services on these nodes may continually monitor the health of the cluster and be used to diagnose problems.

The store 110 is simply a reliable filestore large enough to hold the entire database. Any appropriate store may be used. The store 110 contains the canonical truth of what the database looks like. The server nodes in the cluster will pull the parts of the database they need directly from the store 110 onto their local disks. The server node local disks serve as another level of caching. Examples of various systems that may be used as the store 110 include one or more of the following: Windows Storage Server or Windows Azure™ Blob Storage; both available from Microsoft Corporation of Redmond Wash.; NetApp Appliance, available from NetApp of Sunnyvale, Calif.; HDFS Cluster available from Apache Software Foundation of Forest Hill, Md. From an implementation point of view a server node instance will serialize partition/shards to the storage sub system. The server node will work with streams, which are easily supported by the above examples.

Figure 3:
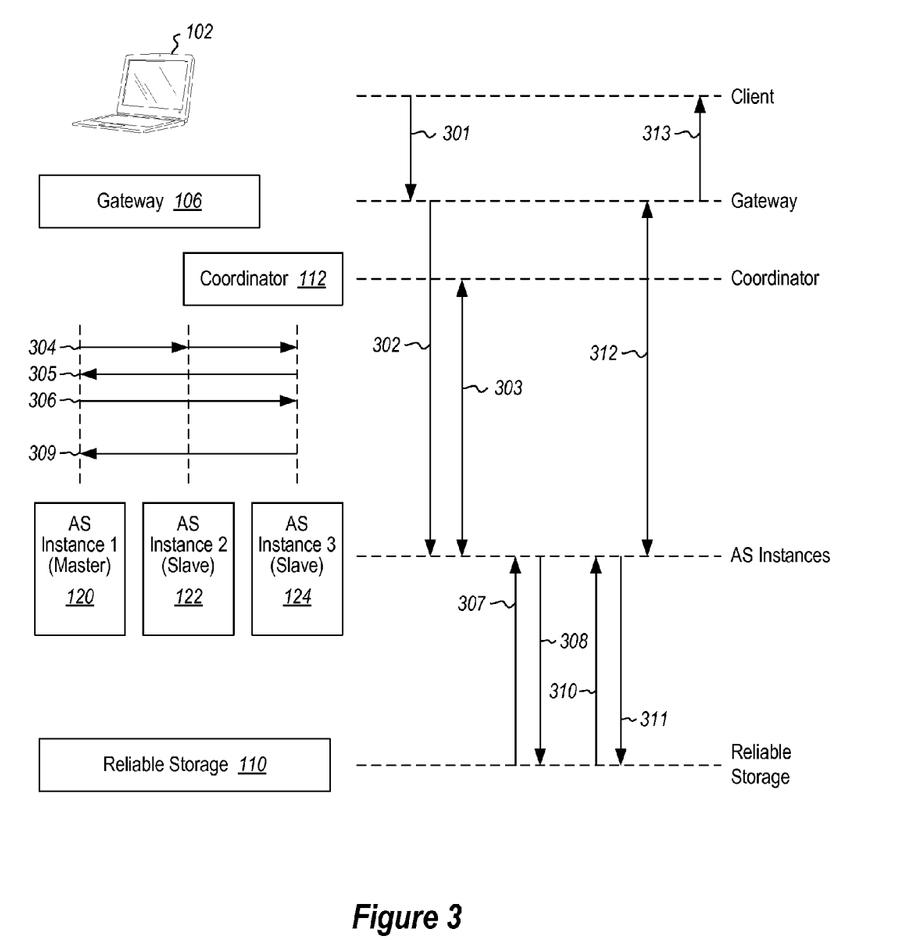
FIG. 3 illustrates various steps for distributed processing.

Referring now to FIG. 3, a detailed example of steps for distributed processing is illustrated. As illustrated at 301, a client 102 sends a process request to the cluster 100 via a gateway 106. As illustrated at 302, the gateway 106 selects and forwards a process update to a server node instance.

As illustrated at 303, a master server node instance 120 contacts the coordinator 112 to obtain a write lock on the database and to requests locations of shards of data. As illustrated at 304, the master server node instance 120 forwards processing commands to slave server node instances 122 and 124. As illustrated at 305, a slave server node instance 124 reports processing phase one complete. As illustrated at 306, the master server node instance 120 instructs the slave server node instance 124 to begin a dictionary merge.

As illustrated at 307, the slave server node instance 124 fetches the current master dictionary from the reliable storage 110 and performs the merge. As illustrated at 308, the slave server node instance 124 persists the merged dictionary to the reliable storage 110. As illustrated at 309, the slave server node instance 124 reports to master server node 120 that the merge is complete for the shard.

As illustrated at 310 a next slave server node fetches the current dictionary and performs a merge. As illustrated at 311 the next slave server node persists to the merged dictionary to reliable storage 110.

As illustrated at 312 the master server node instance 120 reports to the gateway 106 that the operation is complete. This causes a release of the write lock at the coordinator 112. As illustrated at 313, the gateway 106 returns result back to the client 102.

Some embodiments include a new type of encoding (on top of hash and dictionary based encoding) for measures referred to herein as "unencoded mode" or "raw encoding mode". In such a mode, embodiments do not use a surrogate key (referred to herein as a dataid) to map the actual values, and instead persist the values in unencoded form (but nonetheless, still compressed). This mode allows for higher level parallelization. For example, this may eliminate the need for parallel dictionary inserts during parallel processing on a node, eliminate the need to amortize initial dictionary building on master node, eliminate the need to transfer the dictionary between nodes and/or the ability to reconcile clashes regarding dataids. However, a column with an "unencoded" dictionary will not be able to be used on axis in some applications, such as Excel® or be involved in group by operations. However, such a column can still be used inside aggregations and in predicates.

Once all shards have completed their local transactions and have final data synced/copied (as illustrated at 311) to the persistence layer embodied by the reliable storage 110, the master server node 120 can compute a new master version map that takes into account the new partition data available on the persistence layer, and then push the new master version map on the persistence layer (in some embodiments, using a two-phase commit). Partition processing at this point will be completed, the master server node 120 will return the results to the gateway 106 and the gateway will return the results to the client 102.

Embodiments may perform cleanup of stale copies of partition data from the persistence layer in instances involving failed transactions. In some embodiments, the responsibility for this cleanup (on local nodes) is owned by the master server node 120. Additionally, in some embodiments, a master server node may include functionality for informing the coordinator about successful transactions. Thus, the coordinator will be aware of new metadata/partitions resulting from data definition language operations.

Figure 4:
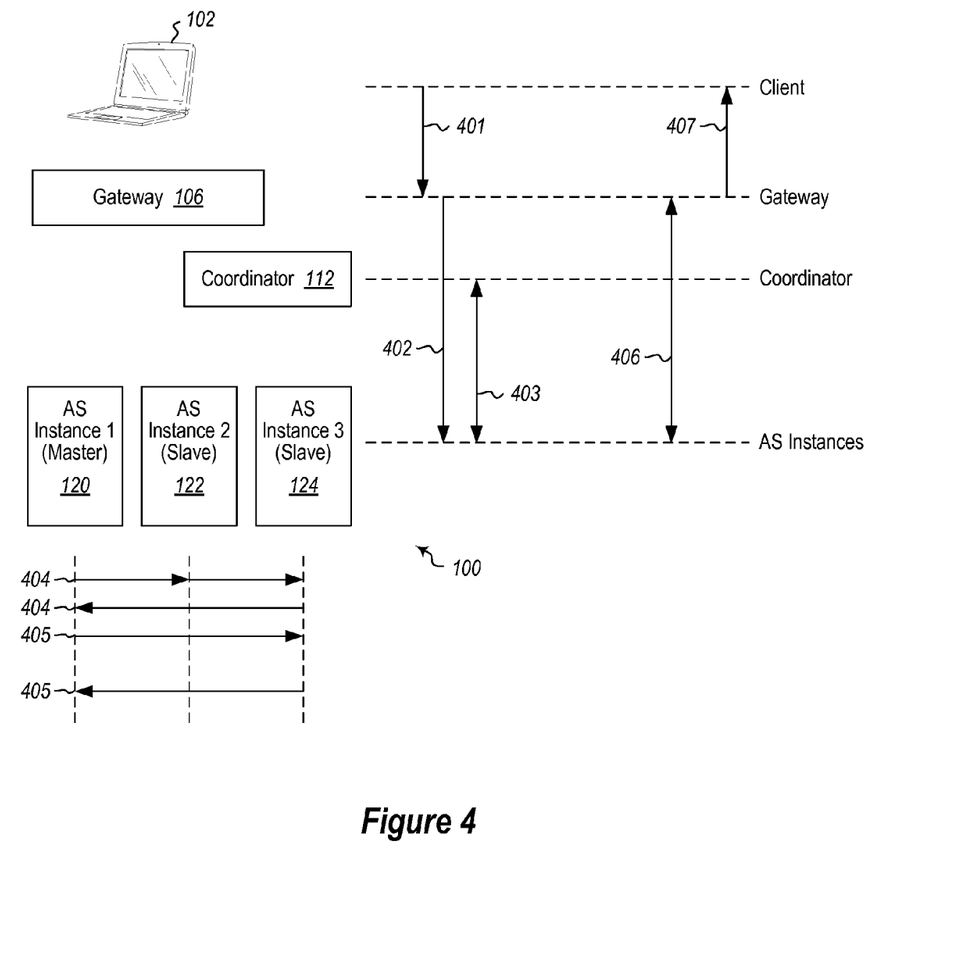
FIG. 4 illustrates various details for a distributed query.

FIG. 4 illustrates details for a distributed query. As illustrated at 401, a client 102 issues a query to the compute cluster 100 by connecting to the gateway 106. As illustrated at 402, gateway selects an instance of a server node 120 running on a round robin basis (or other appropriate basis, such as randomly) from the compute cluster 100 and forwards the query request. As illustrated at 403, the instance of a server node 120 contacts the coordinator 112 to find the location of the shards needed to service the query.

As illustrated at 404, the master server node 120 requests slave server nodes 122 and 124 to perform queries against shards. As illustrated at 405, the slave server nodes 122 and 124 return results to the master server node 120. As illustrated at 406, the master server node 120 returns the merged result back to the gateway 106. As illustrated at 407, the gateway 106 returns the result back to the client 102.

Now that details have been illustrated, discussion is again returned to the simplified representation of FIG. 2. The master node 202 may have fan-out capability limitations that limit the number of slave nodes that the master node 202 can communicate efficiently with. For example, embodiments that utilize xVelocity in SQL Server®, embodiments can scale to about 100 to 200 nodes. Beyond that, serious performance degradation may occur. Thus, for 100-200 nodes, each with 120 GB of memory such embodiments can accommodate (given an average of 10× compression) 1.2 TB×(100-200)=>roughly 200 TB of uncompressed data (although some embodiments may be able to accommodate up to a half PB for higher compressions). Beyond that point, experiments have shown the overhead of communication as well as the server inefficiencies become prevalent. Previously, this had been acceptable for distributed databases. However, recent advancements have made larger distributed databases desirable. In particular, the introduction of solid state drive (SSD) paging greatly increases the amount of perceived memory available from the 120 GB of physical memory to about 2.4 TB of SSD capacity. Some embodiments may use 6×400 GB Intel s3700 drives available from Intel Corporation of Santa Clara, Calif., or 5×480 GB Samsung SM843T drives available from Samsung C&T Corporation of Seoul, South Korea. However, the bandwidth is reduced to about 3 GB/sec for the Intel SSDs or 1.5 GB/sec in the case of the Samsung SSD. The memory bandwidth is 120 GB/sec, however, a CPU bottleneck will be reached at about 30 GB/sec (assuming 2×8 cores running at about 2.2 GHz). Thus, alternative scale-out is performed to maintain the bandwidth, by a factor of 10×.

In addition to the advancements around using SSDs, there is a general desire to host more than 200 TB of uncompressed data.

To address the communication flooding (both at the network layer as well as at the server connection layer) embodiments can implement a hierarchical-unbalanced architecture, when needed.

Figure 5:
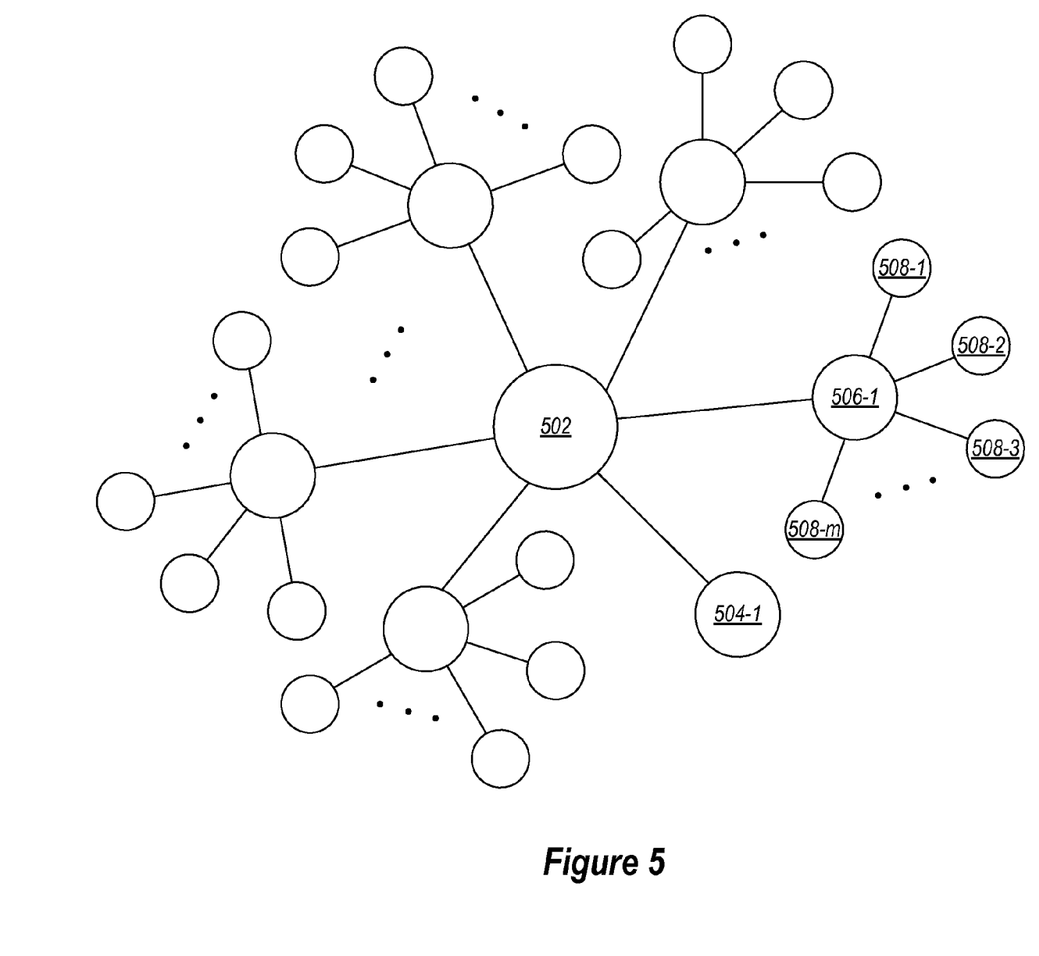
FIG. 5 illustrates a hierarchical node arrangement.

As illustrated in FIG. 5, a master node 502 communicates with a set of endpoints that could either be slave nodes (such as slave node 504-1) or satrap nodes (such as satrap node 506-1), which manage slave nodes (such as slave node 508-1, 508-2, 508-3 through 508-m) in the same fashion as the master node 502, but are themselves managed by the master node 502. The architecture is said to be hierarchical because there are now two layers of slave nodes and it is said to be unbalanced as the master node 502 could communicate directly with a mix of satrap nodes (e.g. satrap node 506-1) and slave nodes (e.g. slave node 504-1). A flow tree might therefor, have two levels but where some leaves are on level one (i.e. slave nodes communicating with the master node 502) and some on level two (i.e. slave nodes communicating with a satrap node, which communicates with the master node 502). This architecture may be referred to herein as MSS (master-satrap-slave).

Embodiments may be dynamic in nature and may select a topology plan based on a given particular query. In particular, in some example queries, a flat two level tree may be sufficient and more efficient at handling the query. In some query examples, a mixed topology plan with a master node communicating with some satrap nodes (which further communicate with slave nodes) and directly (i.e. not through a satrap node) with some slave nodes may be more efficient at handling a query. And in some examples, a topology plan where the master node only communicates with satrap nodes, which further communicate with slave nodes. For example, the master node 502 would only communicate through satrap nodes to communicate with slave nodes and would not communicate with the slave nodes directly.

Thus, if it can be determined that a model is small, in that it can be determined that the number of nodes hosting shards for servicing a query, is below some threshold (e.g., about 200 in the illustrated example), then a query can be handled with only flat communication, such that a two-level tree with master nodes and slave nodes is sufficient.

If the model grows, embodiments still have flexibility. For example, embodiments could communicate with the most used partitions in a direct fashion (i.e. master-slave), while less use partitions can be accessed through the three layer pipeline (master-satrap-slave).

Experimental results have shown that in one embodiment, network edge traversal (with payload—i.e. request/response) is 1.4 ms (for the 95th percentile). A double-edge traversal clocked for the 95th percentile is about 3.2 ms. With the asymmetric freedom described above, embodiments can achieve essentially infinite scale (e.g. up to about 5000 nodes).

Models that can scale up to 100-200 nodes can be used flat (with the current 1.4 ms penalty) while (potentially much) larger models become feasible with a slightly higher penalty.

The following illustrates scaling factors and performance for some example, embodiments using the components described above. To achieve a 1 second response time for a query, some embodiments may need to scan 3 GB (this is the paging performance on the Intel drives described above). Assuming, roughly, a 15% column selectivity, embodiments can host approximately 20 GB of a compressed model per server. By implementing paging, embodiments can host about 100 such sharded models per machine. So, we have the following options:

A pure "flat" model, as described above in conjunction with FIG. 2, can be used up to about 100 to 200 nodes. Assuming 100 nodes, embodiments could implement a 2 TB compressed mode). Assuming 10× compression, the flat model can handle up to 20 TB models.

A "master-satrap-slave" model can be used on about up to 5000 nodes (leading to a 100 TB compressed model). Assuming 10× compression, this means embodiments could handle up to 1 PB models with a 1 second scan for virtually any query. Additionally, multiple 1 PB models could be implemented.

Figure 6:
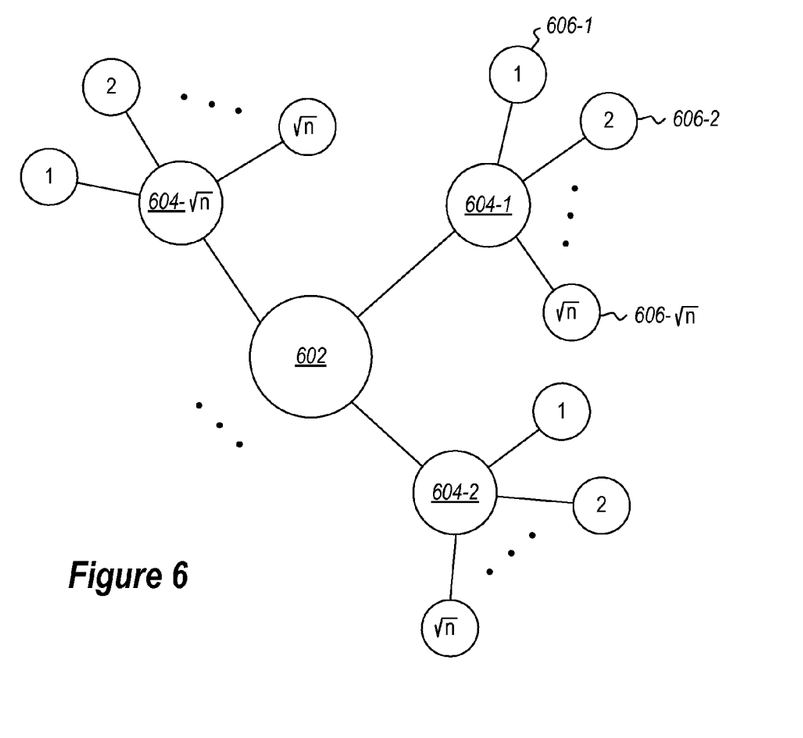
FIG. 6 illustrates a hierarchical node arrangement where node distribution is done in a substantially equal fashion.
Figure 7:
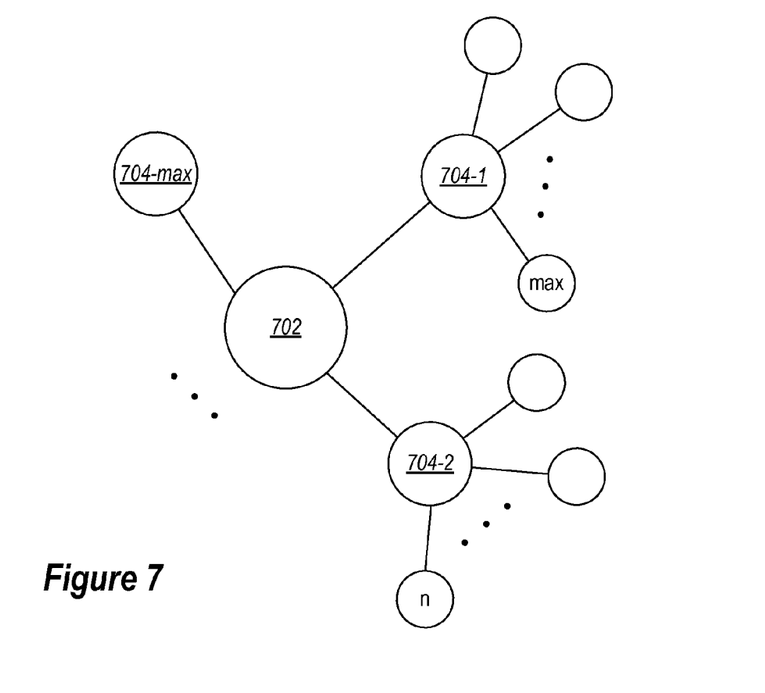
FIG. 7 illustrates an alternative arrangement for hierarchical nodes.

Additional details are now illustrated with respect hierarchical and mixed flat/hierarchical models in the examples illustrated in FIGS. 6 and 7. In particular, details are illustrated with respect to various ways that satrap nodes can be arranged with respect to a master node and ways that slave nodes can be arranged with respect to master nodes and satraps.

FIG. 6 illustrates an example where a hierarchical node distribution is done in a substantially equal fashion. In particular in one substantially equal example, as described previously, operations may be performed using the coordinator 112 to determine the number (n) of nodes needed to satisfy a query. In some embodiments, the square root of n is calculated. If the square root is a whole number, then $\sqrt{n}$ satrap nodes are used with each satrap controlling $\sqrt{n}$ slave nodes. If the square root of n is not a whole number, then adjustments may need to be made such that one or more of the satraps may have to host one more or one less slave nodes than one or more other satraps. Such an arrangement still falls within the scope of substantially equal as used herein. Thus, FIG. 7 illustrates a master node 602, satrap nodes 604-1, 604-2, through 604-$\sqrt{n}$, and each satrap hosting $\sqrt{n}$ slave nodes.

In an alternative example illustrated in FIG. 7, a preselected maximum number of nodes is hosted by the master node 702. If that number is not sufficient, then at least a portion of nodes that are hosted by the master node 702 become satraps and each host a preselected maximum number of nodes or a number of nodes sufficient to satisfy the need for n nodes. Thus, in the example illustrated in FIG. 7, the master node 702 hosts nodes 704-1, 704-2 through 704-max (referred to herein collectively as the 704 series nodes). Nodes 704-1 and 704-2 act as satrap nodes while the rest of the 704 series nodes act as slave nodes. Satrap node 704-1 hosts the maximum number of nodes that have been determined that it should host. Satrap node 704-2 hosts a number of nodes such that all of the 704 series nodes plus any other slave nodes hosted by satrap nodes is approximately equal to the n nodes needed to satisfy the query.

In yet another example, not shown in the figures, slave nodes could be distributed around satrap nodes in an essentially equal fashion. In particular, a maximum number of nodes may be hosted by a master node (such as is illustrated by the 704 series nodes hosted by the master node 702. Slave nodes are then distributed around these nodes (such as in a round robin or random fashion) until a sufficient number of nodes are being hosted to approximately equal the n nodes needed to satisfy the query.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
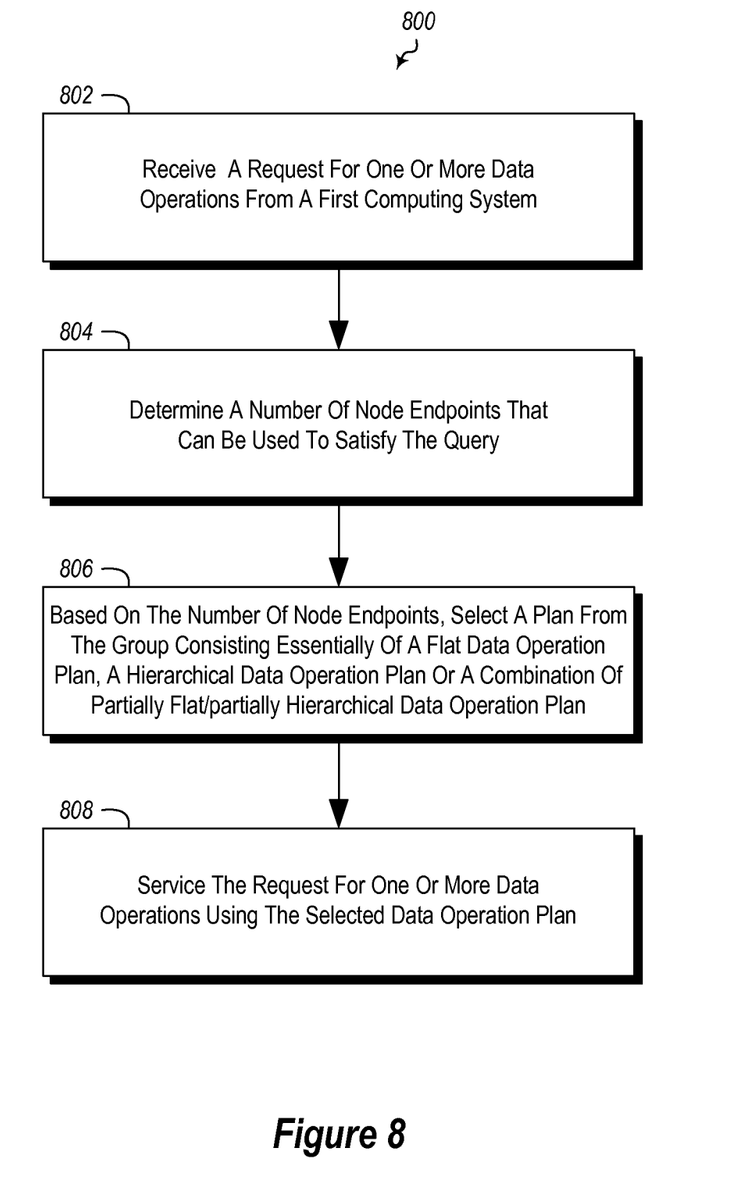
FIG. 8 illustrates a method of performing a distributed data operation.

Referring now to FIG. 8, a method 800 is illustrated. The method 800 may be practiced in a distributed computing environment. The method 800 includes acts for performing a distributed data operation. The method 800 includes receiving a request for one or more data operations from a first computing system (act 802). For example, as illustrated in FIG. 1, the gateway 106 may receive a request from a client 1002. As noted, this may be done directly by the gateway 106 directly receiving the request from the client 102, or in other ways, such as by the gateway receiving the request through a load balancer 104.

The method 800 further includes determining a number of node endpoints that can be used to satisfy the query (act 804). For example, the gateway 106 may determine a number of nodes in the backend 108 that would be needed to satisfy the request from the client.

The method 800 further includes, based on the number of node endpoints, selecting a plan from the group consisting essentially of a flat data operation plan, a hierarchical data operation plan or a combination of partially flat/partially hierarchical data operation plan (act 806). For example, the gateway 106 may select to use a flat plan such as that illustrated in FIG. 2, a strictly hierarchical plan having at least three hierarchical levels, such as that illustrated in FIG. 5, or a mixed plan, such as those illustrated in FIGS. 6 and 7.

The method 800 further includes servicing the request for one or more data operations using the selected data operation plan (act 808).

The method 800 may further include determining the endpoints hosting shards needed to satisfy the data operations. In some such embodiments, determining a number of node endpoints is based on the node endpoints on which the shards are hosted. For example, the gateway 106 may be able to consult a sharded table that indicates where particular shards are hosted. In this way, the gateway 106 can identify the exact nodes needed to satisfy the request. Further, in some such embodiments, the method 800 may include determining that the plan should be at least partially hierarchical, and selecting a number of intermediary endpoints. In some embodiments, the endpoints may be selected based on the location of endpoints hosting shards. For example, an intermediary endpoint may be selected to be a master for shard hosting endpoints that share the same server rack as the intermediary endpoint, that are in the same geographical location as the intermediary endpoint, that are in logical proximity (e.g. same domain or subnet) as the intermediary endpoint, share the same fault domain as the intermediary endpoint, etc.

Alternatively or additionally, the intermediary nodes may be selected based on a cost determination including factors including communication costs to hierarchical nodes and cost to assemble distributed query results. In particular, there are various costs associated with servicing a request. Such costs may be costs in terms of time or resource usage. In particular, such costs may include costs for network communications, costs for assembling shards, and other costs. Costs can be increased (or decreased) by various conditions. For example, network communications may become more difficult, a machine may become overloaded, etc. When selecting whether to use an intermediate node or to simply add another slave node, a cost comparison may be implemented. In particular, there is a time and resource cost with a double network jump when a master must communicate with a slave through a satrap. However, the server may be overloaded if the server attempts to communicate directly with the slave. Thus, a cost comparison can be performed to determine if it is more efficient to simply add another slave to a server or to use a satrap to communicate with slaves.

Some embodiments of the method 800 may include selecting intermediary node endpoints in a round robin fashion. Alternatively or additionally, embodiments of the method 800 may include selecting intermediary node endpoints in a random fashion.

Some embodiments of the method 800 may be implemented where the plan is configured such that a substantially even distribution of endpoint nodes is made across intermediary nodes. Such an example is illustrated by FIG. 6 and the accompanying description above.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limi- The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for performing a distributed data operation, the method comprising the computer system performing the following:
   receiving a request to perform one or more data operations, the one or more data operations being performed by at least some of a plurality of node endpoints, wherein each node endpoint of the plurality includes a partition of a sharded table;
   determining how many node endpoints are needed to satisfy the request, wherein the determination is at least partially based on information obtained from an updateable directory that is consulted in response to the request, the updateable directory detailing where each partition of the sharded table is located in each of the plurality of node endpoints such that the updateable directory maps the sharded table across the plurality of node endpoints;
   after determining how many node endpoints are needed to satisfy the request, servicing the request to perform the one or more data operations, wherein servicing the request to perform the one or more data operations includes:
      after determining how many node endpoints are needed to satisfy the request, select a particular set of node endpoints that will be used to service the request;
      from within the particular set, designate a particular node endpoint to act as a master node endpoint and designate each remaining node endpoint included within the particular set as slave node endpoints; and
      direct the request and all subsequent requests included within the session of requests to the master node endpoint.

2. The method of claim 1, wherein the method further includes selecting a partially flat/partially hierarchical data operation plan to service the request from a plurality of operation plans, and wherein a number of intermediary node endpoints are selected to implement the partially hierarchical data operation plan.

3. The method of claim 2, wherein the intermediary node endpoints are selected based on a location of node endpoints hosting shards.

4. The method of claim 2, wherein the intermediary node endpoints are selected based on a cost determination including factors, which factors include communication costs to hierarchical nodes and cost to assemble distributed query results.

5. The method of claim 4, further comprising selecting intermediary node endpoints in a round robin fashion.

6. The method of claim 4, further comprising selecting intermediary node endpoints in a random fashion.

7. The method of claim 2, wherein after determining how many node endpoints are needed to satisfy the request, the method further includes selecting a data operation plan from a group comprising a flat data operation plan, a hierarchical data operation plan, or a combination of partially flat/partially hierarchical data operation plan, and wherein the selected data operation plan is configured such that a substantially even distribution of node endpoints is made across intermediary node endpoints.

8. In a distributed computing environment, a computer system comprising:
   one or more processors; and
   one or more computer readable hardware storage devices having stored thereon computer executable instructions that are executable by the one or more processors and that cause the computer system to perform a distributed data operation by causing the computer system to:
      receive a request to perform one or more data operations, the one or more data operations being performed by at least some of a plurality of node endpoints, wherein each node endpoint of the plurality includes a partition of a sharded table;
      determine how many node endpoints are needed to satisfy the request, wherein the determination is at least partially based on information obtained from an updateable directory that is consulted in response to the request, the updateable directory detailing where each partition of the sharded table is located in each of the plurality of node endpoints such that the updateable directory maps the sharded table across the plurality of node endpoints;
      after determining how many node endpoints are needed to satisfy the request, service the request to perform the one or more data operations, wherein servicing the request to perform the one or more data operations includes:
         after determining how many node endpoints are needed to satisfy the request, select a particular set of node endpoints that will be used to service the request;
         from within the particular set, designate a particular node endpoint to act as a master node endpoint and designate each remaining node endpoint included within the particular set as slave node endpoints; and
         direct the request and all subsequent requests included within the session of requests to the master node endpoint.

9. The computer system of claim 8, wherein the method further includes selecting a partially hierarchical data operation plan to service the request from a plurality of operation plans, and wherein a number of intermediary node endpoints are selected to implement the partially hierarchical data operation plan.

10. The computer system of claim 9, wherein the intermediary node endpoints are selected based on a location of node endpoints hosting shards.

11. The computer system of claim 9, wherein the intermediary node endpoints are selected based on a cost determination including factors, which factors include communication costs to hierarchical nodes and cost to assemble distributed query results.

12. The computer system of claim 11, wherein the computer executable instructions further cause the computer system to select intermediary node endpoints in a round robin fashion.

13. The computer system of claim 11, wherein the computer executable instructions further cause the computer system to select intermediary node endpoints in a random fashion.

14. The computer system of claim 9, wherein after determining how many node endpoints are needed to satisfy the request, the method further includes selecting a data operation plan from a group comprising a flat data operation plan, a hierarchical data operation plan, or a combination of partially flat/partially hierarchical data operation plan, and wherein the selected data operation plan is configured such that a substantially even distribution of node endpoints is made across intermediary node endpoints.

15. One or more hardware storage device having stored thereon computer executable instructions that are executable by one or more processors of a computer system to cause the computer system to perform a distributed data operation by at least causing the computer system to:
  receive a request to perform one or more data operations, the one or more data operations being performed by at least some of a plurality of node endpoints, wherein each node endpoint of the plurality includes a partition of a sharded table;
  determine how many node endpoints are needed to satisfy the request, wherein the determination is at least partially based on information obtained from an updateable directory that is consulted in response to the request, the updateable directory detailing where each partition of the sharded table is located in each of the plurality of node endpoints such that the updateable directory maps the sharded table across the plurality of node endpoints;
  after determining how many node endpoints are needed to satisfy the request, service the request to perform the one or more data operations, wherein servicing the request to perform the one or more data operations includes:
    after determining how many node endpoints are needed to satisfy the request, select a particular set of node endpoints that will be used to service the request;
    from within the particular set, designate a particular node endpoint to act as a master node endpoint and designate each remaining node endpoint included within the particular set as slave node endpoints; and
    direct the request and all subsequent requests included within the session of requests to the master node endpoint.

16. The one or more hardware storage device of claim 15, wherein the method further includes selecting a partially flat/partially hierarchical data operation plan to service the request from a plurality of operation plans, and wherein a number of intermediary node endpoints are selected to implement the partially hierarchical data operation plan.

17. The one or more hardware storage device in accordance with claim 16, wherein the intermediary node endpoints are selected based on a location of node endpoints hosting shards.

18. The computer system of claim 8, wherein the one or more data operations include a data processing operation, and wherein servicing the data processing operation includes:
  causing a first slave node endpoint to fetch a data item from persistent storage and perform a merge on the data item;
  causing a second slave node endpoint to perform a second merge on the data item;
  persisting the data item to the persistent storage; and
  in response to persisting the data item, causing the master node endpoint to compute a new version of the updateable directory and persisting the new version of the updateable directory to the persistent storage.

19. The computer system of claim 8, wherein the one or more data operations include a query operation, and wherein servicing the query operation includes:
  causing the master node endpoint to request at least some of the slave node endpoints to perform one or more sub-queries;
  for each slave node endpoint that performed a sub-query, saving results of each sub-query locally on each corresponding slave node endpoint;
  in addition to locally saving the results, causing the slave node endpoints to pass the results to the master node endpoint; and
  causing the master node endpoint to aggregate the results to form a final result.

* * * * *